United States Patent [19]
Santora

[11] 4,206,030
[45] Jun. 3, 1980

[54] ELECTRODE ASSEMBLY

[75] Inventor: Scott A. Santora, Hammonton, N.J.

[73] Assignee: Waste Conversion Technology, Inc., Camden, N.J.

[21] Appl. No.: 962,996

[22] Filed: Nov. 22, 1978

[51] Int. Cl.² .................. C02B 1/82; C25B 11/02; C25B 13/00
[52] U.S. Cl. .................. 204/242; 204/149; 204/151; 204/283
[58] Field of Search .......... 204/242, 283, 14, 151, 204/299, 149, 152, 252

[56] References Cited
U.S. PATENT DOCUMENTS

| | | | |
|---|---|---|---|
| 1,739,766 | 12/1929 | Morris | 204/299 R X |
| 2,620,298 | 12/1952 | Fischer | 204/299 R |
| 2,997,430 | 8/1961 | Föyn | 204/151 |
| 3,446,725 | 5/1969 | Spengler et al. | 204/283 X |
| 3,479,281 | 11/1969 | Kikindai et al. | 210/44 |

*Primary Examiner*—Arthur C. Prescott
*Attorney, Agent, or Firm*—George A. Smith, Jr.

[57] ABSTRACT

An improved electrode assembly for use in electrolytic flotation for wastewater treatment comprises a series of overlying layers of foraminous mesh arranged in substantially horizontal planes, wherein electrically conductive mesh layers constituting the anode and cathode are maintained in closely spaced relationship with each other, but are prevented from coming into direct contact with each other by one or more insulating mesh layers.

4 Claims, 5 Drawing Figures

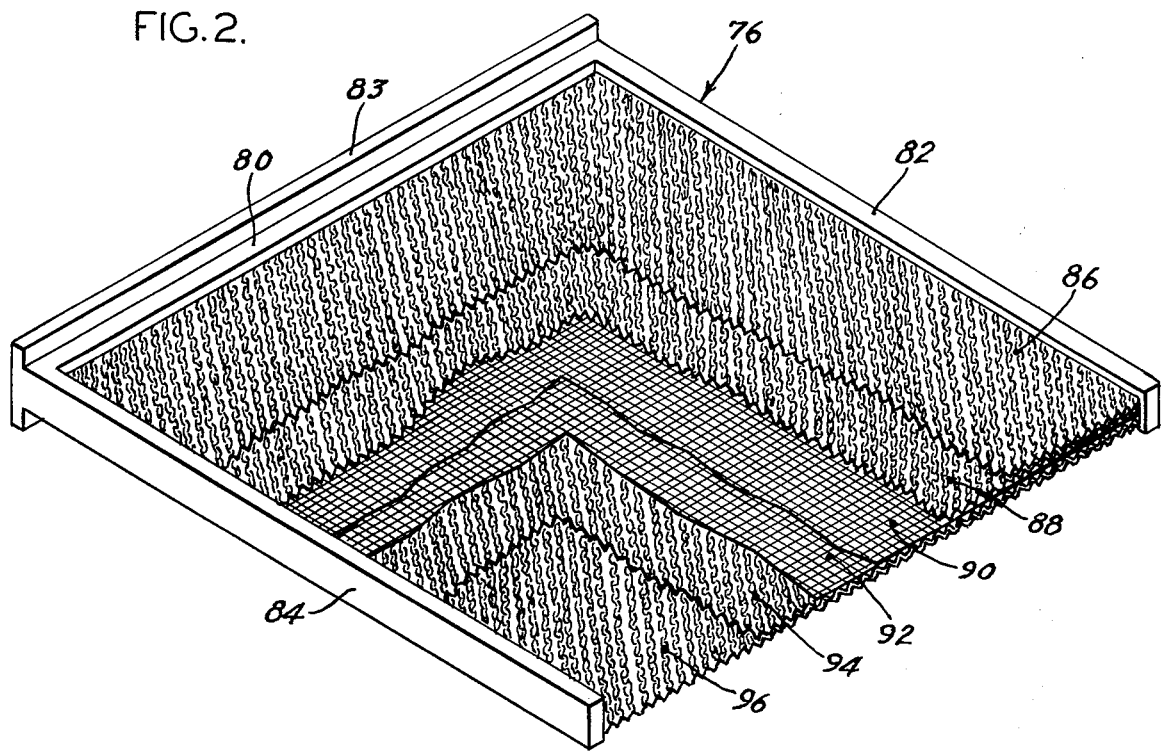
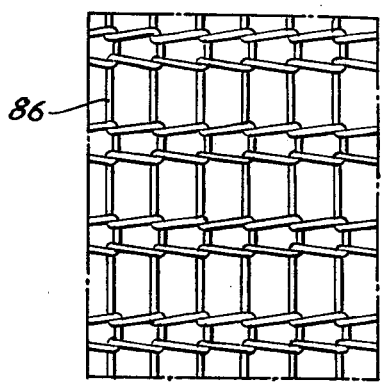
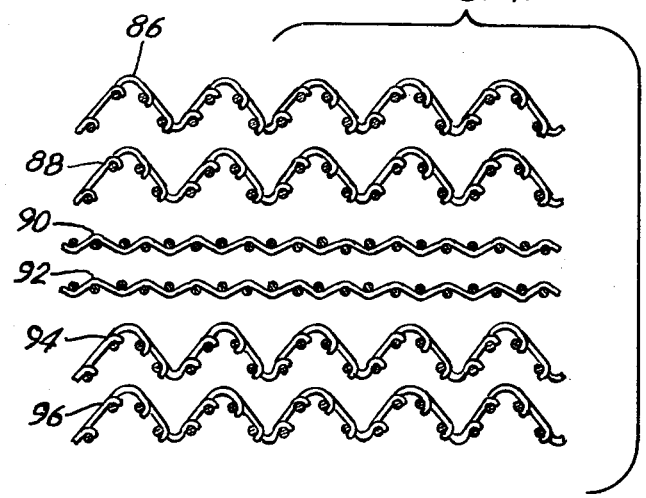
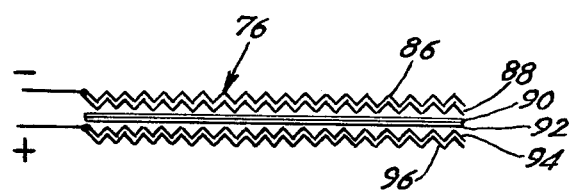

ELECTRODE ASSEMBLY

SUMMARY OF THE INVENTION

This invention relates to the electrolytic generation of minute gas bubbles for the separation of gases, organic liquids and suspended or colloidal particles from water. The processes in which bubbles can be used advantageously in the separation of these materials from water include flotation, chemcial reaction and stripping. The invention relates particularly to improvements in electrode structures for the purpose of improving the uniformity of bubble distribution and for reducing electric power requirements. It has particular utility in wastewater treatment, although its applications are not necessarily limited to wastewater treatment processes.

Suspended and colloidal solid particles can be separated from liquids by floc formation, which is carried out by the introduction of chemical agents which cause the solids to agglomerate. Typically, the chemical agents which are introduced into the liquid include a coagulant and a polyelectrolyte. The coagulant alters the electrical character of the suspended particles thereby allowing them to settle or float depending on the physical treatment which is used. Ferric chloride is a commonly used coagulant. The polyelectrolyte allows the particles, which have been destabilized by the coagulant, to aggregate and adhere to each other, thereby forming larger particles at an increased rate.

While the floc is allowed to settle by gravity in some separation processes, it is frequently caused to rise to the surface of the liquid by the use of gas bubbles in a process known as flotation. In flotation, the bubbles become trapped in the floc producing composite particles consisting of gas and solid, having an average specific gravity well below that of the suspending liquid. The floc rises rapidly to the surface of the liquid where it is skimmed off mechanically.

Various methods have been used for bubble formation in flotation. For example, bubbles can be formed by air diffusion, by release of air from a dissolved state, and by electrolytic formation of gases. The electrolytic method is frequently preferred because it is capable of producing very minute bubbles at a controllable rate. Electrolysis also aids coagulation by improving the efficiency of collision between particles. The electrolytic method is also advantageous because it tends to dewater the sludge which collects at the surface of the electrolysis cell, and also because the electrolytic action tends to strip the wastewater of ammonia, halogenated methanes and methanol and various other organic substances. The fine bubbles generated by electrolytic action also tend to float out finely divided greases, oils and hexane.

A typical electrolytic system utilizes an array of parallel tubular carbon electrodes one or more inches in diameter, or an array of plates arranged either vertically or horizontally.

One of the problems in the use of electrolytic methods for bubble formation is that in large scale processes, such as municipal or industrial waste treatment processes, the cost of electricity is high. Waste treatment by electrolytic flotation, even in the best system, requires at least approximately 1400 watt-hours per gallon. Another problem in electrolytic generation is that a geometrically uniform release of bubbles throughout the flotation tank was very hard to achieve.

The invention overcomes both of these problems by the use of a novel electrode assembly comprising first and second electrically conductive electrodes, in which the first electrode comprises an electrically conductive foraminous mesh. The first and second electrodes are arranged in closely spaced facing relationship to each other over an area, and foraminous insulating means are located between the first and second electrodes to prevent the electrodes from coming into contact with each other.

Thus, instead of utilizing parallel arrays of side-by-side tubular electrodes, the improved electrode assembly in accordance with this invention comprises at least one conductive foraminous mesh constituting one electrode, spaced from the other electrode by a non-conductive foraminous mesh. The mesh electrode produces extremely minute bubbles in the flotation tank with a high degree of geometric uniformity for optimum performance in causing the floc to rise to the surface of the tank. The foraminous non-conductive mesh which insulates the electrodes from each other permits the electrodes to be very closely spaced, which substantially reduces the electrical power requirements for bubble generation. The success of the novel electrode structure is due primarily to the fact that at least one electrode, and the insulating means are constructed as foraminous meshes, as this structure permits the gas bubbles generated at both electrodes to be released uniformly throughout the flotation tank. The manner in which the meshes achieve uniformity will be more readily understood by reference to the drawings and the Detailed Description which follows.

In order to increase the effective area of the electrodes, the electrodes can be made in the form of a mesh having parallel corrugations. A further increase in the effective area can be achieved by utilizing multiple layers of corrugated mesh.

When the electrode assembly is used in a conventional electrolytic flotation vessel, the electrodes are arranged one above the other, and at least the upper electrode comprises an electrically conductive foraminous mesh arranged in a first substantially horizontal plane. The lower electrode, which may also be but is not necessarily a foraminous conductive mesh, is arranged in a second substantially horizontal plane within the flotation vessel below the first plane. The upper and lower electrodes are again arranged in closely spaced facing relationship to each other over an area, and foraminous insulating means are provided, located in the third plane between the first and second planes to prevent the upper and lower electrodes from coming into contact with each other.

An important object of the invention is to provide an effective electrode assembly for electrolytic flotation in which a high degree of geometric uniformity of the released minute bubbles is achieved.

Another important object of the invention is the reduction of electric power requirements in flotation, and especially in flotation processes used for municipal and industrial wastewater treatment.

The invention also has among its objectives the provision of an inexpensive, easily replaceable, non-clogging and durable electrode assembly which is at the same time capable of achieving excellent results in terms of pollutant separation effectiveness. Various other objects and advantages will be apparent from the following Detail Description when read in conjunction with the drawings.

BRIEF DESCRIPTION OF THE DRAWINGS

FIG. 2 is a partially cut away perspective view showing the various layers of a preferred electrode assembly in accordance with the invention;

FIG. 3 is a fragmentary plan view showing the details of a foraminous mesh electrode used in the assembly of FIG. 2;

FIG. 4 is an exploded vertical section showing the various layers of a preferred multiple-layer electrode assembly; and FIG. 5 is a vertical section taken through the preferred electrode assembly.

DETAILED DESCRIPTION

Figure 1:
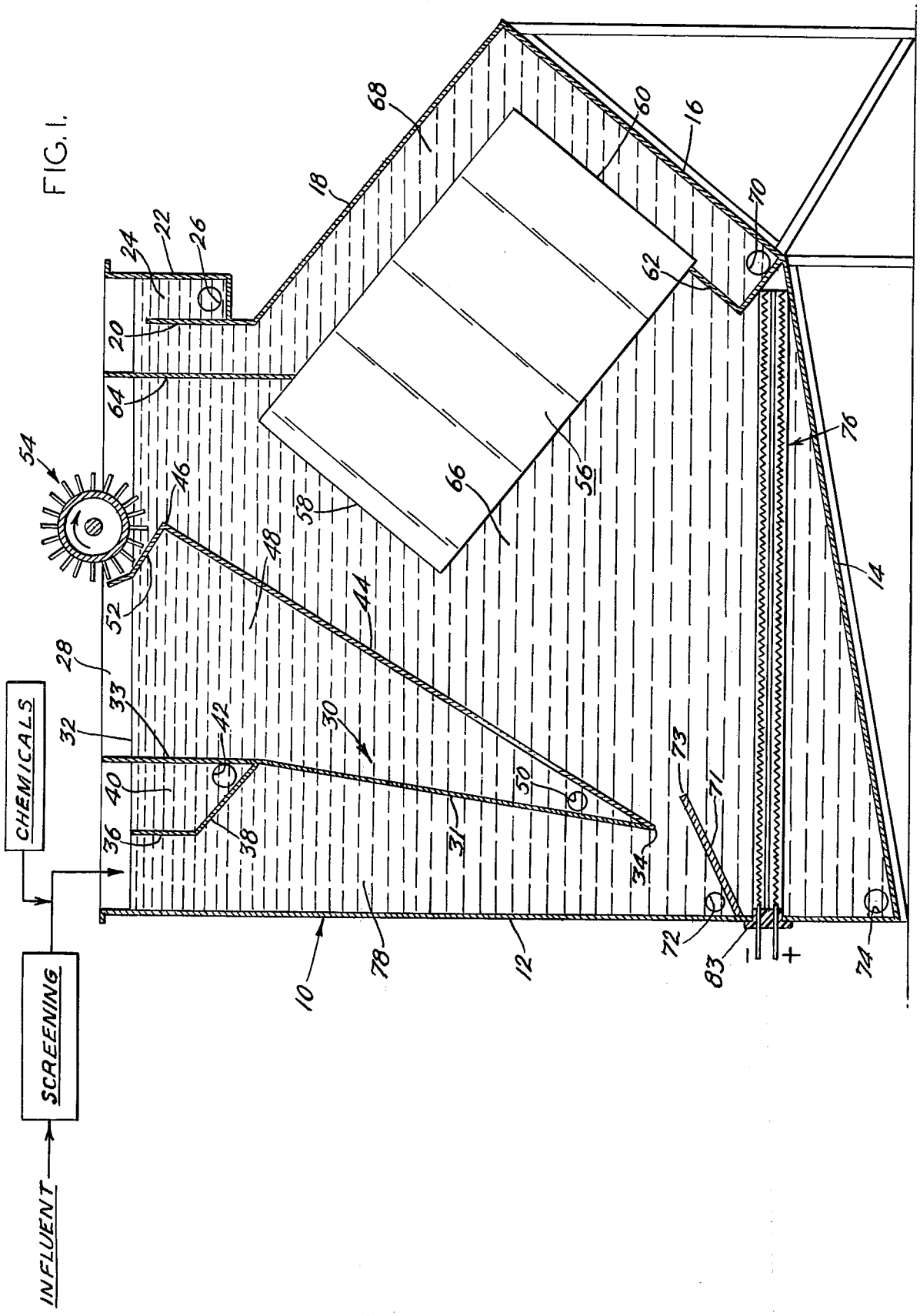
FIG. 1 is a vertical section through a preferred form of flotation vessel equipped with an electrode assembly in accordance with the invention.

The flotation vessel 10 of FIG. 1 comprises a vertical end wall 12, a bottom 14 sloping upwardly from the bottom of wall 12, a lower right-hand side wall member 16, and an upper right-hand side wall member 18, members 16 and 18 sloping respectively outwardly and inwardly in the upward direction. At the upper end of wall 18, a vertical weir 20 is provided which, together with wall 22, defines a discharge chamber 24 having an outlet 26. A vertical side wall 28, which is perpendicular to all of the members just described encloses the far side of the vessel, and a similar vertical side wall (not shown) encloses the near side of the vessel.

A partition 30, extends between side wall 28 and the opposite side wall from a point above the normal liquid level 32 to an intermediate point 34 within the vessel. Partition 30 comprises a sloping lower part 31 and a vertical upper part 33. A weir 36 is provided at the left-hand side of part 33, and a sloping wall 38 extends downwardly from the lower edge of weir 36 to the upper end of part 31 of partition 30. Elements 33, 36 and 38 define a compartment 40 having an oil drain port 42.

A sloping baffle 44 extends from point 34 to a point 46 a short distance below the normal liquid level 32, and, together with partition 30, defines a compartment 48 having a chemical sludge drain port 50. At the upper end 46 of baffle 44, a surface 52 is provided, over which a continuously rotating scraper 54 skims solid material into compartment 48. Various forms of scrapers can be used, including the single wheel type as shown, and the double wheel drag type.

Also within the vessel a corrugated plate interceptor 56 is provided. The corrugated plate interceptor is a multiple corrugated plate device of the type described in Cornelissen U.S. Pat. No. 3,346,122 dated Oct. 10, 1967, the disclosure of which is incorporated here by reference. Stated briefly, the corrugated plate interceptor is in the shape of a rectangular prism and has an upper opening 58 and a lower opening 60, and is otherwise closed. The interceptor contains an array of corrugated plates, the corrugations running lengthwise between openings 58 and 60, and the plates being spaced from each other to provide flow paths in the direction of the corrugations. Gutters (not shown) at openings 58 and 60 cause oils and solid materials to flow in the desired directions as they pass outwardly between the corrugated plates.

The interceptor itself extends throughout the distance between side wall 28 and its opposite side wall, and together with baffles 62 and 64, interceptor 56 divides the portion of the vessel to the right of baffle 44 into two separate compartments 66 and 68, the only communication between compartments 66 and 68 being through the interceptor itself. A sludge discharge port 70 is provided at the bottom of compartment 68. An oblique baffle 71 extends upwardly and to the right from an intermediate point on wall 12 to a point 73 located to the right of point 34. Baffle 71 catches any sludge which settles out in compartment 78 between wall 12 and partition 30, and delivers the settled sludge to a sludge outlet port 72. Drain port 74 is provided at the bottom of the left-hand portion of the vessel for draining liquid from the vessel.

Electrode assembly 76, which is the subject matter of this invention, preferably extends substantially horizontally from wall 12 to baffle 62, and from side wall 28 to its opposite side wall in order to release minute gas bubbles throughout compartment 66.

Electrode assembly 76, as shown in FIG. 2, preferably comprises a support, and multiple layers of foraminous mesh material forming the electrodes and insulating means. The support comprises an end member 80, and side members 82 and 84 extending perpendicularly from the ends of end member 80. End member 80 is also provided with a sealing flange 83, which extends above and below the foraminous mesh assembly, and cooperates with wall 12 of the flotation vessel as shown in FIG. 1.

The support assembly, of course, can take various forms, and can be made from various materials. The only essential requirements of the support are that it holds the foraminous mesh layers in proper relationship to each other and to the flotation vessel, and that it should not provide a direct conductive path between the positive and negative electrodes. The support assembly can be made, for example, from a glass fiber-reinforced polyester resin or from various alternative plastic or ceramic insulating materials.

The preferred electrode assembly shown in the drawings comprises six layers. Upper layers 86 and 88 are conductive foraminous meshes which together form the negative electrode. Intermediate layers 90 and 92 are insulating foraminous meshes. Lower layers 94 and 96 are conductive foraminous meshes which together form the positive electrode. The pularity of the electrodes, of course can be reversed so that the upper electrode is positive and the lower electrode is negative.

The conductive layers 86, 88, 94 and 96 are preferably in the form of corrugated knitted wire, as shown in FIG. 4, the stitch being shown in plan view in FIG. 3. The peaks and troughs of the corrugations are preferably aligned, as shown in FIGS. 4 and 5, so that the corrugations of each multiple mesh electrode are in interlocking relationship when assembled.

The conductive meshes can be made of various materials, which are preferably chosen for high corrosion resistance in the presence of the particular coagulating agent used (usually ferric chloride). Platinum wire, or platinum-plated wire can be used, and are highly corrosion-resistant, though quite expensive. A more practical corrosion-resistant wire is a nickel-cobalt alloy, such as Nickel 200, available from Huntingdon Alloys of Huntingdon, W.Va. Various forms of stainless steel can also be used, as can graphite fibers, graphite-coated plastics, and graphite-coated metals.

In some wastewater treatment systems it is desirable to have free chlorine present in order to kill viruses and to oxidize ammonia. Where the electrolytic release of nascent chlorine from the chlorides in the wastewater is desired, at least the positive electrode is preferably made from graphite, or graphite-coated materials. The electrolytic release of chlorine reduces the supplemental demand for chlorine in the system.

Insulating layers 90 and 92, which are shown in woven form, can be made from any suitable insulating material, such as PTFE or polypropylene.

The mesh openings in the conductive and insulating layers are preferably made as small as possible, while still sufficiently large to permit gas bubbles to pass readily through the various mesh layers. Preferably, the mesh openings are at least 25 microns in size.

Preferably, insulating layers 90 and 92, when placed together in overlying relationship are just sufficient to insure that direct contact between conductive layers 88 and 94 is prevented. In this way, the conductive layers are brought into sufficiently close relationship to each other as to minimize the energy requirements for treating a given quantity of liquid.

When electric current is applied (preferably D.C., though alternating current can be used), minute bubbles of hydrogen form on and are released from the negative electrode, while minute bubbles of oxygen form on and are released from the positive electrode. Depending on the composition of the wastewater, other gases such as ozone and chlorine may be formed at the positive electrode. The bubbles form on all or very nearly all locations on the surface of each conductive wire mesh, and are released to rise in the flotation vessel with a high degree of geometric uniformity. The bubbles from the lower electrodes pass upwardly through the openings in insulating meshes 90 and 92 and through the openings in conductive meshes 86 and 88, and rise in the liquid along with the hydrogen bubbles.

The use of a wire mesh permits the multiple layers to be used, for more electrode surface area and consequent generation of greater numbers of bubbles, but at the same time permits the bubbles generated from lower electrodes in a group of similarly charged electrodes to pass through openings in the upper electrodes of the group.

The corrugations of the conductive meshes allow for greater conductive areas than would otherwise be possible, and the interleaving of corrugations in multiple conductive layers brings all of the layers in a group comprising a particular electrode into the closest possible proximity to the opposite electrode for maximum operating efficiency.

In the operation of the apparatus of FIG. 1, influent wastewater is passed through fine mesh screening apparatus and delivered to compartment 78. A coagulating agent such as ferric chloride, together with a polyelectrolyte, is added to the influent wastewater, preferably following screening. Direct current (typically between one and three amperes per gallon depending on the wastewater composition) is applied to the electrodes in electrode assembly 76. The coagulating agent acts as an electrolyte, permitting the conduction of current through the liquid between the electrodes. Minute bubbles are released from the electrode assembly, and float upwardly through compartment 66, and are combined with the floc which is formed by the action of the coagulant and the polyelectrolyte. The bubbles of gas cause the floc to rise rapidly to the surface in compartment 66. The solids in compartment 66 collect as a sludge at the surface of the liquid in the compartment. This sludge is delivered by rotating scraper 54 into compartment 48, and is continuously discharged through port 50 by suitable pumping means. At the same time, liquid flowing downwardly through the corrugated plate interceptor entrains particulate matter, which is carried into the interceptor through its upper opening 58. Gas bubbles are also entrained into the interceptor. In the interceptor, the entrained gas bubbles combine with the solid floc particles, and lift the floc particles out of the interceptor in the reverse direction along the peaks of the corrugations. These floc particles, which pass out of the interceptor in the reverse direction eventually find their way to the surface of the liquid in compartment 66, and are delivered by the rotating scraper into compartment 48. The interceptor is made highly effective in the removal of particles from the liquid in this manner primarily by reason of the fact that the electrode assembly is able to produce large quantities of extremely fine bubbles, which, because of their fineness, are able to be entrained into the interceptor.

Particles which find their way to the bottom opening 60 of the interceptor settle in compartment 68 and are periodically removed through discharge port 70 by the action of suitable pumps.

The liquid at the upper end of compartment 68 is substantially solid-free, and flows over weir 20 into compartment 24, from which it is discharged continuously through discharge port 26.

Liquid in compartments 78 and 66 can be discharged through outlet 74. Sludge is discharged periodically through ports 42 and 72 by pumping. Any sludge which settles on bottom 14 of the vessel falls down to discharge port 74, through which it can be removed periodically by pumping.

From the foregoing, it will be appreciated that the electrode assembly in accordance with the invention has as its principal advantages the ability to produce a geometrically more uniform release of bubbles in the flotation cell, and its ability to carry out electrolytic flotation with a low electric power consumption while maintaining a high degree of effectiveness in separating the various gaseous, liquid and solid pollutants from the wastewater being treated.

While a preferred form of electrolytic flotation cell has been described, it will be appreciated that the electrode assembly can be used effectively in various alternative cell configurations, and further that the configuration of the electrode assembly itself, and the materials from which it is made can be varied by those skilled in the art in order to achieve certain specific results without departing from the scope of the invention as defined by the following claims.

I claim:

1. In an electrolytic flotation vessel adapted to contain a quantity of liquid, an electrode assembly, located within said vessel below the normal liquid level therein, comprising first and second electrodes, said first electrode comprising at least one electrically conductive foraminous layer and said second electrode comprising at least one electrically conductive foraminous layer overlying said first electrode, characterized by the fact that each layer of said second electrode is an electrically conductive wire mesh and by an electrically non-conductive foraminous mesh located between and being in contact with said first and second electrodes and preventing said first and second electrodes from coming into contact with each other.

2. An electrode assembly according to claim 1 in which each layer of said first electrode is an electrically conductive wire mesh.

3. An electrode assembly according to claim 1 in which each layer of said second electrode is an electrically conductive corrugated wire mesh.

4. An electrode assembly according to claim 1 in which said second electrode comprises two electrically conductive foraminous layers, each of said two layers being a corrugated wire mesh, said two layers being arranged in face-to-face relationship with the corrugations in the respective layers being in interlocking relationship.

* * * * *